UNITED STATES PATENT OFFICE.

HEINRICH TRAUN, OF HAMBURG, GERMANY.

PROCESS OF VULCANIZING HARD-RUBBER ARTICLES.

SPECIFICATION forming part of Letters Patent No. 528,264, dated October 30, 1894.

Application filed July 17, 1894. Serial No. 517,794. (Specimens.) Patented in Germany January 16, 1892, No. 74,491.

*To all whom it may concern:*

Be it known that I, HEINRICH TRAUN, a citizen of Germany, and a resident of Hamburg, Germany, have invented certain new and useful Improvements in the Process of Vulcanizing Hard-Rubber Articles, (patented in Germany with my consent by Harburger-Gummi-Kamm-Compagnie January 16, 1892, No. 74,491,) of which the following is a specification.

It is well known that in vulcanizing large pieces of hard rubber absolute uniformity is not obtained throughout the entire piece. The cause of this lack of uniformity in finish is mainly due to the poor heat conducting qualities of the rubber, as the same prevents the uniform distribution of heat, that is, it prevents the heat from penetrating all parts of the rubber evenly and uniformly.

The object of my invention is to provide a new and improved process of treating hard rubber in vulcanizing the same so that all parts of the hard rubber article are vulcanized and finished uniformly, without in any way injuriously affecting or disturbing any of the other properties of the rubber and at the same time give the rubber a metallic luster and appearance.

In carrying out my invention I proceed as follows: Pure aluminium or an alloy of aluminium with tin, cadmium or nickel or with one or more of these metals, is finely pulverized and mixed with the rubber paste. Thereby the heat conducting powers of the rubber mass are vastly increased and the interior and exterior of the articles are vulcanized uniformly, independently of the size or shape of the articles and in a much shorter time than is generally required. The metallic powder is mixed with the rubber while incorporating the sulphur or other substances into the rubber in the well known manner and the rubber is molded or shaped and then vulcanized in the well known manner.

In some cases it is advisable to mix the aluminium or its alloys with the sulphur and other substances that are to be incorporated into the rubber beforehand, then fuse this mixture, and pulverize it and then mix it with the rubber. The admixture of the metallic aluminium or its alloys not only causes uniform vulcanizing but it greatly facilitates working and finishing the vulcanized article and besides produces colors in the rubber, of great lasting qualities and great brilliancy.

I am well aware that other metals, metal salts and metal oxides have been mixed with rubber before vulcanizing the same, for the purpose of adding weight and producing better vulcanizing, but such metals, metal salts and oxides did not increase the heat conducting qualities of the rubber sufficiently to produce any appreciable results and did not give the rubber a brilliant color.

Having thus described my invention, what I claim as new, and desire to secure by Letters Patent, is—

1. In the art of vulcanizing hard rubber, the improvement, which consists in adding to the soft rubber before vulcanizing it, besides the usual vulcanizing substances, pulverized metallic aluminium, substantially as set forth.

2. As an improved article of manufacture, a hard rubber article with which is incorporated pulverized metallic aluminium, substantially as set forth.

In testimony that I claim the foregoing as my invention I have signed my name, in presence of two witnesses, this 26th day of June, 1894.

HEINRICH TRAUN.

Witnesses:
HERMANN COLPE,
FRITZ GÜNDELACH.